United States Patent
Garcia Azorero et al.

(10) Patent No.: US 11,871,339 B2
(45) Date of Patent: Jan. 9, 2024

(54) FILTERS FOR BULK SUBSCRIPTIONS

(71) Applicant: Telefonaktiebolaget LM Ericsson (publ), Stockholm (SE)

(72) Inventors: Fuencisla Garcia Azorero, Madrid (ES); Ignacio Rivas Molina, Madrid (ES); Susana Fernandez Alonso, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 425 days.

(21) Appl. No.: 17/290,069

(22) PCT Filed: Aug. 29, 2019

(86) PCT No.: PCT/IB2019/057300
§ 371 (c)(1),
(2) Date: Apr. 29, 2021

(87) PCT Pub. No.: WO2020/089707
PCT Pub. Date: May 7, 2020

(65) Prior Publication Data
US 2022/0272619 A1    Aug. 25, 2022

(30) Foreign Application Priority Data
Nov. 2, 2018    (EP) ..................... 18382786

(51) Int. Cl.
*H04W 48/18*    (2009.01)
*H04W 4/029*    (2018.01)
(Continued)

(52) U.S. Cl.
CPC ............. *H04W 48/18* (2013.01); *H04L 67/02* (2013.01); *H04W 4/029* (2018.02); *H04W 8/183* (2013.01); *H04W 8/186* (2013.01); *H04W 68/005* (2013.01)

(58) Field of Classification Search
CPC ..... H04W 48/18; H04W 4/029; H04W 8/183; H04W 8/186; H04W 68/005; H04W 4/02;
(Continued)

(56) References Cited

U.S. PATENT DOCUMENTS

| 11,729,586 B2 * | 8/2023 | Livanos | .................. H04W 8/04 370/312 |
| 2018/0270778 A1 | 9/2018 | Bharatia | |

(Continued)

OTHER PUBLICATIONS

Orange et al., "Updates of Solution #2 and Solution #1 (merging together)", 3GPP TSG-SA WG2 Meeting #129, S2-1811583, Dongguan, China, Oct. 15-19, 2018, XP051486022 (9 pages total).
(Continued)

*Primary Examiner* — Mohamed A Kamara
(74) *Attorney, Agent, or Firm* — Rothwell, Figg, Ernst & Manbeck, P.C.

(57) ABSTRACT

A method performed by a first node (e.g., a network exposure function (NEF)) is provided. The method includes: the first node subscribing to an event for one or more user equipments (UEs) at a second node (e.g., a policy and control function (PCF)). Subscribing to the event comprises indicating one or more filters selected from the group of (i) a set of network identifiers (e.g., data network names (DNNs)) that the subscription applies to, (ii) a set of network slice identifiers (e.g., single network slice selection assistance information (S-NSSAIs)) that the subscription applies to, and (iii) a set of locations that the subscription applies to.

22 Claims, 5 Drawing Sheets

(51) Int. Cl.
*H04L 67/02* (2022.01)
*H04W 8/18* (2009.01)
*H04W 68/00* (2009.01)

(58) Field of Classification Search
CPC ......... H04W 4/08; H04W 8/04; H04W 76/40; H04L 67/02; H04L 67/04; H04L 67/30
See application file for complete search history.

(56) References Cited

U.S. PATENT DOCUMENTS

2019/0053010 A1* 2/2019 Edge ..................... H04W 4/029
2020/0396570 A1* 12/2020 Livanos ................ H04W 76/40

OTHER PUBLICATIONS

Nokia, Nokia Shanghai Bell, "Update to solution 14", S2-1810670 (revision of S2-1810670), SA WG2 Meeting #129, Oct. 15-19, 2018, Dongguan, PRC, https://www.3gpp.org/ftp/tsg_sa/WG2_Arch/TSGS2_129_Dongguan/Docs/S2-1810670 (4 pages).
3GPP TSG CT WG3, "Presentation sheet for TS 29.508 v 1.0.0 for 5G System; Session Management Event Exposure Service; Stage 3", CP-181039, 3GPP TSG CT Meeting #80, Jun. 11-12, 2018, La Jolla, US, https://www.3gpp.org/ftp/tsg_ct/TSG_CT/TSGC_80_La_Jolla/Docs/CP-181039 (33 pages).
Ericsson et al., "Npcf_EventExposure service for bulk subscription", S2-1811531 (revision of S2-180219), SA WG2 Meeting #S2-129, Oct. 15-19, 2018, Dongguan, P. R. China, https://www.3gpp.org/ftp/tsg_sa/WG2_Arch/TSGS2_129_Dongguan/Docs/S2-1811531 (5 pages).
Intel, "Solution update and interim conclusion for Key issue #11: Monitoring", SA WG2 Meeting #128, S2-187219 (revision S2-186705), Jul. 2-6, 2018, Vilnius, Lithuania (3 pages).
Huawei et al., "KI#3: Update of Solution 25" 3GPP TSG SA WG 2 #129, S2-1811459 (was S2-1811459, 11178, 11134, 10618), Oct. 15-19, 2018, Dongguan, PRC (9 pages).

International Search Report and Written Opinion dated Nov. 11, 2019 in International Application No. PCT/IB2019/057300 (10 pages total).
3GPP TS 23.501 V15.3.0, Sep. 2018, 3rd Generation Partnership Project; Technical Specification Group Services and System Aspects; System Architecture for the 5G System; Stage 2 (Release 15) (226 pages).
3GPP TS 23.502 V15.3.0, Sep. 2018, 3rd Generation Partnership Project; Technical Specification Group Services and System Aspects; Procedures for the 5G System; Stage 2 (Release 15) (330 pages).
3GPP TS 23.503 V15.3.0, Sep. 2018, 3rd Generation Partnership Project; Technical Specification Group Services and System Aspects; Policy and Charging Control Framework for the 5G System; Stage 2 (Release 15) (70 pages).
3GPP TS 29.510 V15.1.0, Sep. 2018, 3rd Generation Partnership Project; Technical Specification Group Core Network and Terminals; 5G System; Network Function Repository Services; Stage 3 (Release 15) (84 pages).
Nokia et al., TS 23.502: Exposure—Bulk event subscription, SA WG2 Meeting #122bis, S2-176643, Aug. 21-25, 2017, Sophia Antipolis, France, XP051335952, Retrieved from the Internet: URL:http://www.3gpp.org/ftp/tsg_sa/WG2_Arch/TSGS2_122BIS_Sophia_Antipolis/Docs/ (10 pages).
Orange, Namf_Event Exposure Service: implement a Restful One-Time Report using a GET service operation, 3GPP TSG CT WG4 Meeting #86, C4-186321, Aug. 20-24, 2018, West Palm Beach, US, XP051566539, Retrieved from the Internet: URL:http://www.3gpp.org/ftp/tsg%5Fct/WG4%5Fprotocollars%5Fex%2DCN4/TSGCT4%5F86%5FPalm%5FBeach/Docs/C4%2D186321%2Ezip (46 pages).
Nokia et al., Improvements on the specification of the subscription to Network Exposure, SA WG2 Meeting #125, S2-181268, Jan. 22-26, 2018, Gothenburg, Sweden, XP051382649, Retrieved from the Internet: URL:http://www.3gpp.org/ftp/Meetings%5F3GPP%5FSYNC/SA2/Docs/ (16 pages).
Ericsson, "Npcf_EventExposure service for bulk subscription," SA WG2 Meeting #S2-129, S2-1811531 (revision of S2-180219), Oct. 15-19, 2018, Dongguan, China (5 pages).

* cited by examiner

FILTERS FOR BULK SUBSCRIPTIONS

CROSS REFERENCE TO RELATED APPLICATIONS

This application is a 35 U.S.C. § 371 National Stage of International Patent Application No. PCT/IB2019/057300, filed Aug. 29, 2019, designating the United States, which claims priority to EP application no. 18382786.4, filed on Nov. 2, 2018. The above identified applications are incorporated by this reference.

TECHNICAL FIELD

Disclosed are embodiments related to filters for bulk subscriptions.

BACKGROUND

Bulk subscription to events in Policy and Control Function (PCF) nodes in 5G is specified by 3GPP TS 23.502 (V15.3.0) and TS 23.503 (V15.3.0).

3GPP TS 23.502, clause 4.15.3.2.4 ("Exposure with bulk subscription") describes how the Network Exposure Function (NEF) may perform bulk subscription with the Network Functions (NFs) that provide the necessary services. Clause 4.15.1 defines the general framework for subscription to events.

For the PCF, a new service, the Npcf_EventExposure, has been recently defined, as described in the subchapters below. For example, the change request to TS 23.502 CR 0745 Revision 4, Version 15.3.0, which is available at http://3gpp.org/ftp/tsg_sa/WG2_Arch/TSGS2_129_Dongguan/Docs/S2-1811531.zip, defines the Npcf_EventExposure service for bulk subscription.

Npcf_EventExposure service

General

Service description: This service enables an NF to subscribe and get notified about PCF events. The events can be subscribed by a NF consumer are described in TS 23.503, clause 6.1.3.x. The following service operations are defined for the Npcf_EventExposure service: (i) Npcf_EventExposure_Subscribe, (ii) Npcf_EventExposure_UnSubscribe, and (iii) Npcf_EventExposure_Notify. These three service operations are described below.

Npcf_EventExposure_Subscribe Service Operation

Service operation name: Npcf_EventExposure_Subscribe

Description: The consumer NF uses this service operation to subscribe to or modify event reporting for a group of UE(s) or any UE accessing a combination of (data network name (DNN), single network slice selection assistance information (S-NSSAI)).

NF Consumers: NEF.

Inputs (required): NF ID, target of the subscription (Internal Group Identifier or indication that any UE accessing a combination of (DNN, S-NSSAI) is targeted, (set of) Event ID(s) defined in clause 5.2.5.x.1, Notification Target Address (+Notification Correlation ID) and Event Reporting Information defined in Table 4.15.1-1.

Inputs (optional): Event Filter (s) associated with each Event ID.

Outputs (required): Operation execution result indication. When the subscription is accepted: Subscription Correlation ID.

Outputs (optional): First corresponding event report is included, if corresponding information is available (see clause 4.15.1).

The NF consumer subscribes to the event notification by invoking Npcf_EventExposure to the PCF. The PCF allocates a Subscription Correlation ID for the subscription and responds to the consumer NF with the Subscription Correlation ID. Event receiving NF ID identifies the NF that shall receive the event reporting.

Npcf_EventExposure_Unsubscribe Service Operation

Service operation name: Npcf_EventExposure_Unsubscribe

Description: The NF consumer uses this service operation to unsubscribe for a specific event for a group of UE(s) or any UE accessing a combination of (DNN, S-NSSAI).

Inputs (required): Subscription Correlation ID.

Input (optional): None.

Outputs (required): Operation execution result indication.

Output (optional): None.

Npcf_EventExposure_Notify Service Operation

Service operation name: Npcf_EventExposure_Notify

Description: This service operation reports the event to the consumer that has previously subscribed.

Inputs (required): Event ID, corresponding UE ID (GPSI), Notification Correlation Information, time stamp, Inputs (optional): None.

Outputs (required): None.

SUMMARY

PCF exposure with bulk subscription allows the NF service consumer to receive event information for a group of UEs or any UE. The events for which this functionality applies have been recently specified to include PLMN change and access type change events. It is also possible for an NF service consumer to subscribe to other events with the PCF. NF service consumers can also provide service information to allow the PCF to identify the services to which the subscription applies.

However, with the current state of the art, it is not possible for the NF service consumer to provide a more accurate filtering for the events that a PCF can notify based on a network the user is accessing (e.g., a data network name (DNN)), the selected network slice (e.g., a S-NSSAI), or a set of locations (including a single location). This means that the NF service consumer (1) would receive unnecessary information for scenarios the service consumer is not interested in; and (2) would not be able to classify the received information based on parameters such as a network identifier (e.g., DNN), network slice identifier (e.g., S-NSSAI), or a set of locations where the event has occurred. As an example, with the current state of the art, the NF service consumer is not able to monitor the access type change related to a certain group of users that are in a specific location or that are accessing a certain network (e.g. IMS).

Embodiments provide additional filters, apart from the subscription filters, which may apply to any of the possible events, and to any of the corresponding services. The proposed additional filters include a set of one or more network identifiers (e.g., DNNs), a set of one or more network slice identifiers (e.g., S-NSSAIs), and a set of one or more locations. A location may be defined at varying levels of granularity; e.g., a boundary defined by specific coordinates, a jurisdiction such as a city or county, a building, a specific floor in a building, a stretch of roadway, as being within a certain radius of a node, and so on.

Embodiments allow for smart filtering of the events for which a node (e.g., a PCF) can provide a notification. Embodiments also allow a node (e.g. an NF service consumer) to become aware of the actual network identifiers (e.g., DNNs) and/or network slice identifiers (e.g., S-NSSAIs) where the subscribed events are observed, or to get event information only related to the filters that the service consumer is interested in (e.g. network identifier, network slice identifier, location). Embodiments further enable an enhanced definition of the event-exposure- and bulk-subscription-related services in the node (e.g., PCF), much better adapted to the full flexibility a 5GC NF service consumer requires.

According to embodiments, the request for bulk subscription to events in the node (e.g., PCF) is enhanced to allow filtering per interesting or desired identifiers, e.g. DNNs and S-NSSAIs and locations for the NF service consumers of the subscription to PCF events. Additionally, embodiments allow the notification of a matched event to include the information related to identification of the network or network slice (e.g., DNN or SNSSAI) of the protocol data unit (PDU) session affected by the matched event and/or the identification of the list of network slices (e.g., S-NSSAIs) allowed in the current registration, and affected by the matched events. In addition, embodiments allow the notification of a matched event to include a location, e.g. matching what the NF service consumer has previously indicated in the subscription for the event.

The above and other embodiments are described below.

According to a first aspect, a method, performed by a first node, is provided. The method includes the first node subscribing to an event for one or more user equipments (UEs) at a second node. Subscribing to the event comprises indicating one or more filters selected from the group of (i) a set of network identifiers that the subscription applies to, (ii) a set of network slice identifiers that the subscription applies to, and (iii) a set of locations that the subscription applies to.

In some embodiments, subscribing comprises sending to the second node a message comprising an event identifier, one or more UE identifiers, and filter information describing the one or more filters. In some embodiments, the set of network identifiers that the subscription applies to includes all network identifiers. In some embodiments, the set of network slice identifiers that the subscription applies to includes all network slice identifiers. In some embodiments, the set of locations that the subscription applies to includes all locations. In some embodiments, the one or more filters selected includes (i) a set of network identifiers that the subscription applies to. In some embodiments, the one or more filters selected includes (ii) a set of network slice identifiers that the subscription applies to. In some embodiments, the one or more filters selected includes (iii) a set of locations that the subscription applies to.

In some embodiments, the method further includes the first node receiving a notification that an event has occurred that matches the subscribed-to event for the one or more UEs. In some embodiments, the notification includes an indication of one or more of a network identifier, a network slice identifier, and a set of locations corresponding to the matched event.

In some embodiments, subscribing to the event may include indicating one or more filters for the identification of services (e.g., services that one or more AF sessions may belong to). That is, a filter may support per service identification, such as by including a set of service identifiers (e.g., Ethernet flows or IP flows) and/or a set of application identifiers. Such filter(s) for the identification of services may be in addition to the one or more filters selected from the group of (i) a set of network identifiers that the subscription applies to, (ii) a set of network slice identifiers that the subscription applies to, and (iii) a set of locations that the subscription applies to. Alternatively, or in addition, subscribing to the event comprises indicating one or more filters selected from the group of (i) a set of network identifiers that the subscription applies to, (ii) a set of network slice identifiers that the subscription applies to, (iii) a set of locations that the subscription applies to, and (iv) a set of service identifiers.

According to a second aspect, a method, performed by a first node, is provided. The method includes the first node receiving a notification from a second node that an event has occurred. The notification includes an indication of one or more of a network identifier, a network slice identifier, and a set of locations corresponding to the event.

According to some embodiments, notification that an event has occurred may include information about the PDU session involved in the reported event. For example, such information may include the IPv4 and/or IPv6 prefix; the Ethernet MAC address; and/or the IP domain. Information about the services involved in the reported event may also be provided, which may include per identified service. For example, the notification may further include an indication of a set of Ethernet flows, a set of IP flows, and/or a set of application identifiers (e.g. AF application identifiers).

According to a third aspect, a first node is provided. The first node adapted to subscribe to an event for one or more user equipments (UEs) at a second node. Subscribing to the event comprises indicating one or more filters selected from the group of (i) a set of network identifiers that the subscription applies to, (ii) a set of network slice identifiers that the subscription applies to, and (iii) a set of locations that the subscription applies to.

In some embodiments, subscribing comprises sending to the second node a message comprising an event identifier, one or more UE identifiers, and filter information describing the one or more filters. In some embodiments, the set of network identifiers that the subscription applies to includes all network identifiers. In some embodiments, the set of network slice identifiers that the subscription applies to includes all network slice identifiers. In some embodiments, the set of locations that the subscription applies to includes all locations. In some embodiments, the one or more filters selected includes (i) a set of network identifiers that the subscription applies to. In some embodiments, the one or more filters selected includes (ii) a set of network slice identifiers that the subscription applies to. In some embodiments, the one or more filters selected includes (iii) a set of locations that the subscription applies to. In some embodiments, the first node is further adapted to receive a notification that an event has occurred that matches the subscribed-to event for the one or more UEs. In some embodiments, the notification includes an indication of one or more of a network identifier, a network slice identifier, and a set of locations corresponding to the matched event.

According to a fourth aspect, a first node is provided. The first node is adapted to receive a notification from a second node that an event has occurred. The notification includes an indication of one or more of a network identifier, a network slice identifier, and a set of locations corresponding to the event.

According to a fifth aspect, a computer program is provided, comprising instructions which, when executed on at least one processor, causes the at least one processor to carry out the method according to any one of the embodiments of the first or second aspects.

According to a sixth aspect, a carrier is provided, comprising the computer program of the fifth aspect, wherein the carrier is one of an electronic signal, optical signal, radio signal or computer readable storage medium.

According to a seventh aspect, a method, performed by a second node, is provided. The method includes the second node receiving a subscription from a first node to an event for one or more user equipments (UEs). The subscription to the event comprises an indication of one or more filters selected from the group of (i) a set of network identifiers that the subscription applies to, (ii) a set of network slice identifiers that the subscription applies to, and (iii) a set of locations that the subscription applies to.

In some embodiments, the set of network identifiers that the subscription applies to includes all network identifiers. In some embodiments, the set of network slice identifiers that the subscription applies to includes all network slice identifiers. In some embodiments, the set of locations that the subscription applies to includes all locations. In some embodiments, the one or more filters selected includes (i) a set of network identifiers that the subscription applies to. In some embodiments, the one or more filters selected includes (ii) a set of network slice identifiers that the subscription applies to. In some embodiments, the one or more filters selected includes (iii) a set of locations that the subscription applies to.

In some embodiments, the method further includes the second node sending a notification to the first node that an event has occurred that matches the subscribed-to event for the one or more UEs. In some embodiments, the notification includes an indication of one or more of a network identifier, a network slice identifier, and a set of locations corresponding to the matched event. In some embodiments, the method further includes, prior to sending a notification to the first node that an event has occurred that matches the subscribed-to event for the one or more UEs, applying the one or more filters to determine that the event matches the subscribed-to event.

In some embodiments, the subscription to the event may include an indication of one or more filters for the identification of services (e.g., services that one or more AF sessions may belong to). That is, a filter may support per service identification, such as by including a set of service identifiers (e.g., Ethernet flows or IP flows) and/or a set of application identifiers. Such filter(s) for the identification of services may be in addition to the one or more filters selected from the group of (i) a set of network identifiers that the subscription applies to, (ii) a set of network slice identifiers that the subscription applies to, and (iii) a set of locations that the subscription applies to. Alternatively, or in addition, the subscription to the event comprises indications of one or more filters selected from the group of (i) a set of network identifiers that the subscription applies to, (ii) a set of network slice identifiers that the subscription applies to, (iii) a set of locations that the subscription applies to, and (iv) a set of service identifiers.

According to an eighth aspect, a method, performed by a second node, is provided. The method includes the second node sending a notification to a first node that an event has occurred. The notification includes an indication of one or more of a network identifier, a network slice identifier, and a set of locations corresponding to the event.

According to a ninth aspect, a second node is provided. The second node is adapted to receive a subscription from a first node to an event for one or more user equipments (UEs). The subscription to the event comprises an indication of one or more filters selected from the group of (i) a set of network identifiers that the subscription applies to, (ii) a set of network slice identifiers that the subscription applies to, and (iii) a set of locations that the subscription applies to.

In some embodiments, the set of network identifiers that the subscription applies to includes all network identifiers. In some embodiments, the set of network slice identifiers that the subscription applies to includes all network slice identifiers. In some embodiments, the set of locations that the subscription applies to includes all locations. In some embodiments, the one or more filters selected includes (i) a set of network identifiers that the subscription applies to. In some embodiments, the one or more filters selected includes (ii) a set of network slice identifiers that the subscription applies to. In some embodiments, the one or more filters selected includes (iii) a set of locations that the subscription applies to. In some embodiments, the second node is further adapted to send a notification to the first node that an event has occurred that matches the subscribed-to event for the one or more UEs. In some embodiments, the notification includes an indication of one or more of a network identifier, a network slice identifier, and a set of locations corresponding to the matched event.

In some embodiments, the second node is further adapted to, prior to sending a notification to the first node that an event has occurred that matches the subscribed-to event for the one or more UEs, apply the one or more filters to determine that the event matches the subscribed-to event.

According to a tenth aspect, a second node is provided. The second node is adapted to send a notification to a first node that an event has occurred. The notification includes an indication of one or more of a network identifier, a network slice identifier, and a set of locations corresponding to the event.

According to an eleventh aspect, a computer program is provided, comprising instructions which, when executed on at least one processor, causes the at least one processor to carry out the method according to any one of the embodiments of the seventh and eighth aspects.

According to a twelfth aspect, a carrier is provided, comprising the computer program of the eleventh aspect, wherein the carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
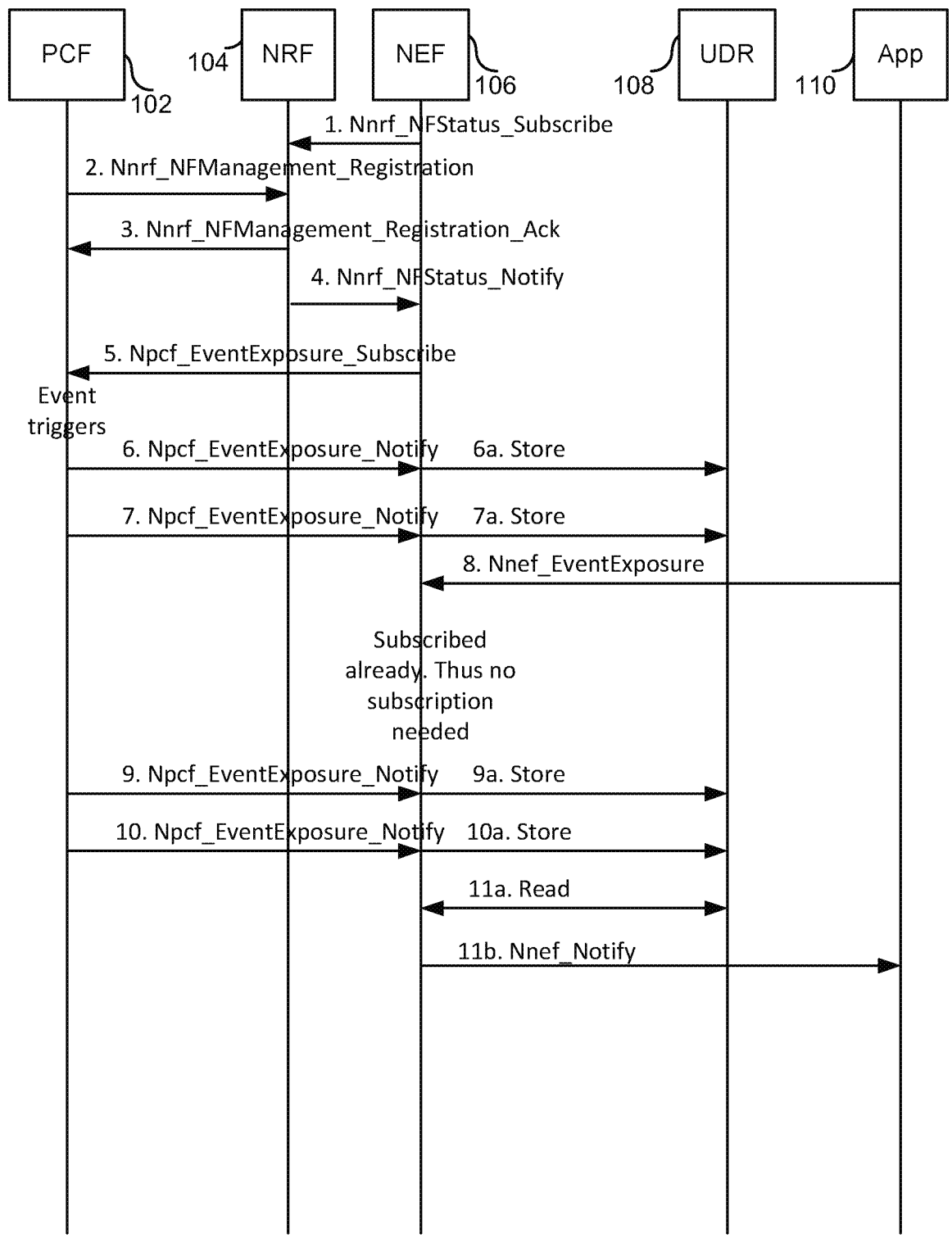
FIG. 1 illustrates a call flow diagram according to some embodiments.

When a first node (such as an NEF) bulk subscribes to events of a second node (such as a PCF), the first node, acting as an NF service consumer of the exposure service offered by the second node, provides a list of event identifiers to subscribe to. Additionally, the first node, acting as the NF service consumer, may indicate per each event subscribed to, (1) whether the subscription applies to a set of network identifiers or network slice identifiers (e.g., DNNs and/or S-NSSAIs), and (ii) whether the subscription applies to a set of locations (e.g. a specific location). Such an indication may include, for each event subscribed to, one or more filters selected from the group of (i) a set of network identifiers (e.g., DNNs) that the subscription applies to, (ii) a set of network slice identifiers (e.g., S-NSSAIs) that the subscription applies to, and (iii) a set of locations that the subscription applies to.

When an event occurs that matches a subscription, the second node (such as the PCF) provides a list of event identifiers that have been met for a given subscription to notify the first node (such as the NEF) of the matched events. For each event met, the second node may include additional information relative to the event (e.g. policy and charging control (PCC) rule status information can be included in case of a failed resources allocation event). In addition, the second node may indicate in the notification, on a per-subscription basis, one or more of a network identifier (e.g., DNN), network slice identifier (S-NSSAI), and location (set of locations) where the observed event occurred.

To determine if an event meets the filter conditions, the second node may match the event conditions against the filter. For example, to determine if an event that occurred in a given location matches the location filter, the second node may determine if the location the event occurred in matches the location filter location, e.g., is the location within the set of locations in the subscription filter. In some embodiments, matching a location where an event occurred to a given location in a set of locations may include determining if the event location is within the other location. For example, an event location may be a set of coordinates, and matching may include determining whether the set of coordinates is within a defined boundary; or an event location may be a given floor of a building, and matching may include determining that the floor is within the west wing of the building, and so on. Likewise, to determine if an event that occurred in a given network or network slice matches the network filter or network slice filter, the second node may determine if the network identifier or network slice identifier corresponding to where the event occurred matches any of the identifiers in the corresponding subscription filters. The match operation may in some embodiments be a set membership operation.

Bulk subscription to events, in some embodiments, may occur as follows. Based on operator configuration, the first node (e.g., the NEF) may perform bulk subscription with the NFs that provide necessary services (e.g., the PCF). This feature is controlled by local policies of the first node that control which events (e.g., set of event ID(s)) and which UE(s) are the target of a bulk subscription.

When the first node performs bulk subscription (e.g., subscribes for all UEs or a limited set of UE(s) (e.g. identifying a certain type of UEs such as Internet of Things (IoT) enabled UEs)), it subscribes to all the NFs that provide the necessary services. Upon receiving bulk subscriptions from the first node, the second node or nodes (the subscribed-to NFs) store this information. Whenever the corresponding event(s) occur for the requested UE(s), as specified in the bulk subscription request, the second node or nodes (NFs) notify the first node with the requested information.

FIG. 1 illustrates a call flow diagram according to an embodiment. As shown, an NEF 106 subscribes to a PCF 102. PCF event exposure can happen for a limited groups of UE(s) (e.g., identifying a certain type of UEs such as IoT UEs) or all UEs, and for the PCFs. As shown, an NF repository function (NRF) 104, unified data repository (UDR) 108, and application (app) 110 are also involved in the call flow.

1. NEF 106 registers with the NRF 104 for any newly registered NF along with its NF services.

PCF Registration in the NRF

2. When a PCF 102 instantiates, it registers itself along with the supported PCF services with the NRF 104.

3. NRF 104 acknowledges the registration.

4. NRF 104 notifies the NEF 106 with the newly registered NF along with the supported NF services.

NEF Bulk Subscription to PCF Events

5. NEF 106 evaluates the PCF 102 and the PCF services supported against the pre-configured events within NEF 106. Based on that, NEF 106 subscribes with the corresponding PCF 102 either for a group of UE(s) (e.g. identifying a certain type of UEs such as IoT UEs), or for all UEs.

The NEF 106 includes in the subscription request a list of subscribed event identifiers (e.g., Access Type change, PLMN change). The NEF 106 may include, in some embodiments, filter information indicating whether the subscription applies (i) to one or more network identifier (e.g. DNN) or to all network identifiers (e.g. any DNN); (ii) to one or more network slice identifier (e.g. S-NSSAI) or to all network slice identifiers (e.g. any S-NSSAI): or (iii) to one or more locations.

The PCF 102 may acknowledge the subscription with the NEF 106 (not shown).

Notification of a Matched Event (I), Steps 6-7

6-7. When the event trigger happens (e.g. PLMN change), the PCF 102 notifies the requested information towards the NEF 106 along with the time stamp, with the PDU identification information (if applicable) that shall include the DNN and S-NSSAI the PDU session applies to and the current location information of the user (if applicable), with the affected services identified by their corresponding service identifier, and with UE registration information (if applicable) that shall include the S-NSSAIs the registration applies to (the allowed S-NSSAIs) and the current location information (if applicable).

The NEF 106 may store the information in the UDR 108 along with the time stamp (shown as 6a and 7a).

8. Application 110 registers with the NEF 106 for a certain event identified by event filters. If the registration for the event is authorized by the NEF 106, the NEF 106 records the association of the event and the requester identity. As shown, the event is already subscribed to, and thus no subscription at the PCF 102 is needed.

Notification of a Matched Event (II), Steps 9-10

9-10. When the event trigger happens (e.g. service authorization change), the PCF 102 notifies the requested information towards the NEF 106 (including service identification information). The NEF 106 may store the information in the UDR 108 (shown as 9a and 10a).

11a-b. The NEF 106 reads from UDR 108 and notifies the application 110 along with the time stamp for the corresponding subscribed events.

Figure 2:
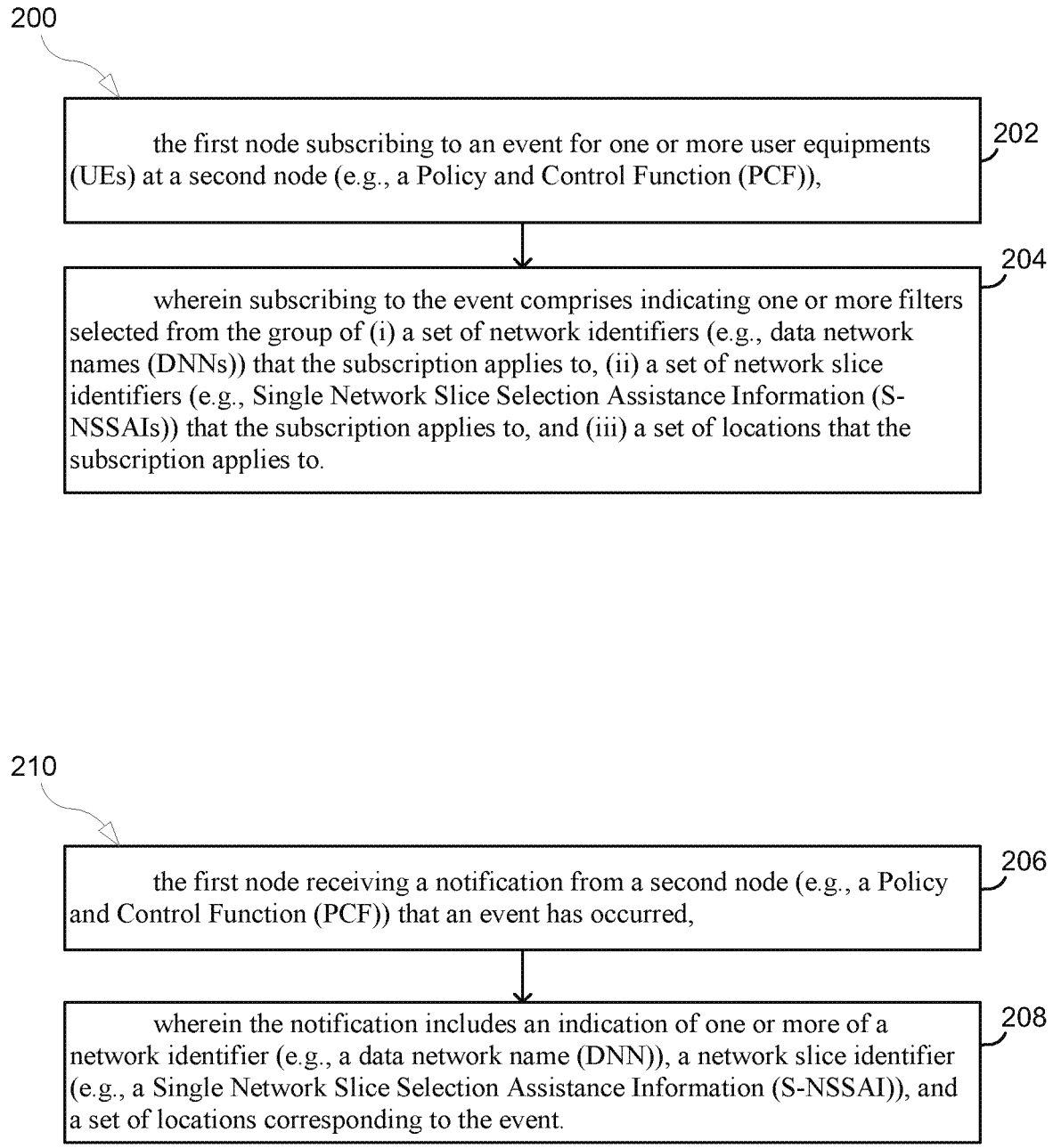
FIG. 2 illustrates flow charts according to some embodiments.

FIG. 2 shows flow charts according to an embodiment. FIG. 2 includes processes 200 and 210.

Process 200 is a method, performed by a first node (e.g., a NEF). The method includes the first node subscribing to an event for one or more UEs at a second node (e.g., a PCF) (step 202). Subscribing to the event includes indicating one or more filters selected from the group of (i) a set of network identifiers (e.g., DNNs) that the subscription applies to, (ii) a set of network slice identifiers (e.g., S-NSSAIs) that the subscription applies to, and (iii) a set of locations that the subscription applies to (step 204).

In some embodiments, subscribing includes sending to the second node a message (e.g., a subscription request) including an event identifier, one or more UE identifiers, and filter information describing the one or more filters.

In some embodiments, the set of network identifiers that the subscription applies to includes all network identifiers, the set of network slice identifiers that the subscription applies to includes all network slice identifiers, and/or the set of locations that the subscription applies to includes all locations. In embodiments, the one or more filters selected includes (i) a set of network identifiers that the subscription applies to. In embodiments, the one or more filters selected includes (ii) a set of network slice identifiers that the subscription applies to. In embodiments, the one or more filters selected includes (iii) a set of locations that the subscription applies to.

In some embodiments, the method further includes the first node receiving a notification that an event has occurred that matches the subscribed-to event for the one or more UEs. In embodiments, the notification includes an indication of one or more of a network identifier, a network slice identifier, and a set of locations corresponding to the matched event.

In some embodiments, subscribing to the event may include indicating one or more filters for the identification of services (e.g., services that one or more AF sessions may belong to). That is, a filter may support per service identification, such as by including a set of service identifiers (e.g., Ethernet flows or IP flows) and/or a set of application identifiers. Such filter(s) for the identification of services may be in addition to the one or more filters selected from the group of (i) a set of network identifiers that the subscription applies to, (ii) a set of network slice identifiers that the subscription applies to, and (iii) a set of locations that the subscription applies to. Alternatively, or in addition, subscribing to the event comprises indicating one or more filters selected from the group of (i) a set of network identifiers that the subscription applies to, (ii) a set of network slice identifiers that the subscription applies to, (iii) a set of locations that the subscription applies to, and (iv) a set of service identifiers.

Process 210 is a method, performed by a first node (e.g., a NEF). The method includes the first node receiving a notification from a second node (e.g., a PCF) that an event has occurred (step 206). The notification includes an indication of one or more of a network identifier (e.g., a DNN), a network slice identifier (e.g., S-NSSAI), and a set of locations corresponding to the event (step 208). In some embodiments, the indication may include specific information regarding network identifiers, network slice identifiers, and sets of locations, depending on whether or not the first node included such filters when subscribing to the event, while in other embodiments, one or more of these may be provided notwithstanding what filter was provided during subscription.

According to some embodiments, notification that a event has occurred may include information about the PDU session involved in the reported event. For example, such information may include the IPv4 and/or IPv6 prefix; the Ethernet MAC address; and/or the IP domain. Information about the services involved in the reported event may also be provided, which may include per identified service. For example, the notification may further include an indication of a set of Ethernet flows, a set of IP flows, and/or a set of application identifiers (e.g. AF application identifiers).

Figure 3:
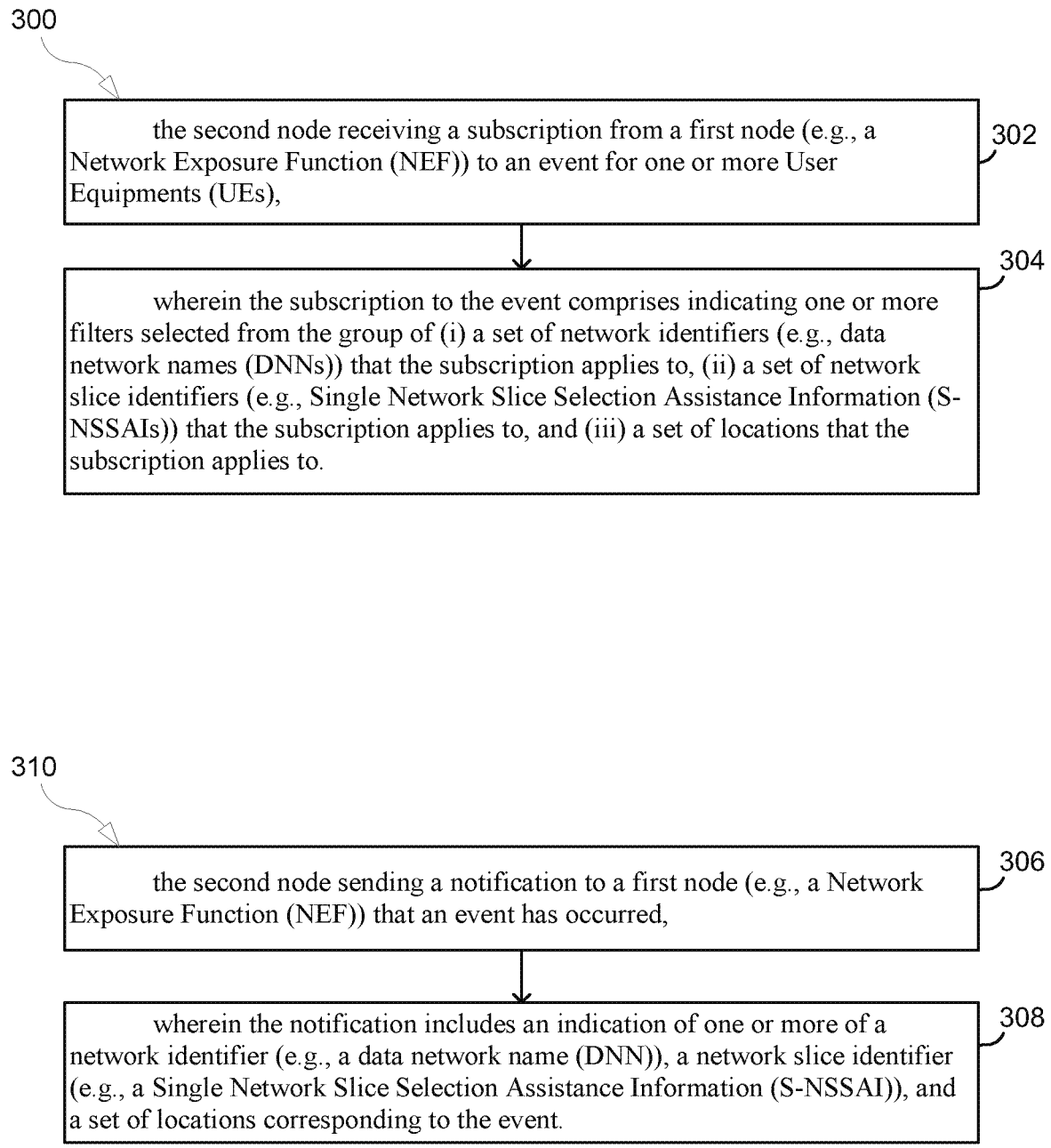
FIG. 3 illustrates flow charts according to some embodiments.

FIG. 3 shows flow charts according to an embodiment. FIG. 3 includes processes 300 and 310.

Process 300 is a method, performed by a second node (e.g., a PCF). The method includes the second node receiving a subscription from a first node (e.g., a NEF) to an event for one or more UEs (step 302). The subscription to the event includes an indication of one or more filters selected from the group of (i) a set of network identifiers (e.g., DNNs) that the subscription applies to, (ii) a set of network slice identifiers (e.g., S-NSSAIs) that the subscription applies to, and (iii) a set of locations that the subscription applies to (step 304). In embodiments, the indication of any one of the filters may further include a list of network identifiers, a list of network slice identifiers, and/or a list of locations. The second node receiving the subscription from the first node may include the second node receiving a message (e.g., a subscription request) from the first node, and the message may include an event identifier, one or more UE identifiers, and filter information describing the one or more filters.

In some embodiments, the set of network identifiers that the subscription applies to includes all network identifiers, the set of network slice identifiers that the subscription applies to includes all network slice identifiers, and/or the set of locations that the subscription applies to includes all locations. In embodiments, the one or more filters selected includes (i) a set of network identifiers that the subscription applies to. In embodiments, the one or more filters selected includes (ii) a set of network slice identifiers that the subscription applies to. In embodiments, the one or more filters selected includes (iii) a set of locations that the subscription applies to.

In some embodiments, the method further includes the second node sending a notification to the first node that an event has occurred that matches the subscribed-to event for the one or more UEs. In embodiments, the notification includes an indication of one or more of a network identifier, a network slice identifier, and a set of locations corresponding to the matched event. In embodiments, the method further includes, prior to sending a notification to the first node that an event has occurred that matches the subscribed-to event for the one or more UEs, applying the one or more filters to determine that the event matches the subscribed-to event.

In some embodiments, the subscription to the event may include an indication of one or more filters for the identification of services (e.g., services that one or more AF sessions may belong to). That is, a filter may support per service identification, such as by including a set of service identifiers (e.g., Ethernet flows or IP flows) and/or a set of application identifiers. Such filter(s) for the identification of services may be in addition to the one or more filters selected from the group of (i) a set of network identifiers that the subscription applies to, (ii) a set of network slice identifiers that the subscription applies to, and (iii) a set of locations that the subscription applies to. Alternatively, or in addition, the subscription to the event comprises indications of one or more filters selected from the group of (i) a set of network identifiers that the subscription applies to, (ii) a set of network slice identifiers that the subscription applies to, (iii) a set of locations that the subscription applies to, and (iv) a set of service identifiers.

Process 310 is a method, performed by a second node (e.g., a PCF). The method includes the second node sending a notification to a first node (e.g., a NEF) that an event has occurred (step 306). The notification includes an indication of one or more of a network identifier (e.g., a DNN), a network slice identifier (e.g., a S-NSSAI), and a set of locations corresponding to the event (step 308). In some embodiments, the indication may include specific information regarding network identifiers, network slice identifiers, and sets of locations, depending on whether or not the first node included such filters when subscribing to the event, while in other embodiments, one or more of these may be provided notwithstanding what filter was provided during subscription.

Figure 4A:
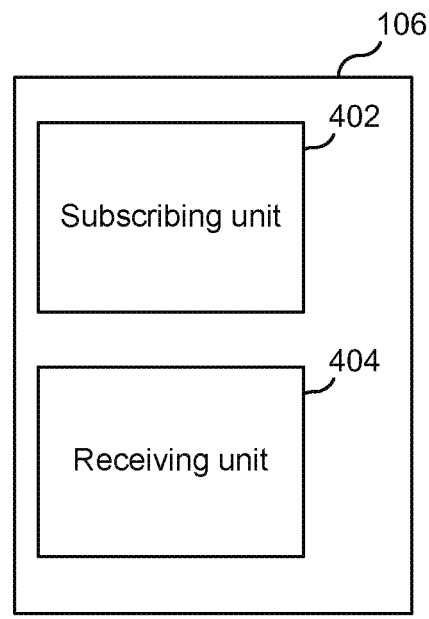
FIG. 4A is a diagram showing functional modules of a first node according to some embodiments.

FIG. 4A is a diagram showing functional modules of a first node (such as NEF 106), according to some embodiments. As shown in FIG. 4A, the first node includes one or more of a subscribing unit 402 and a receiving unit 404. In an embodiment, subscribing unit 402 is configured to subscribe to an event for one or more UEs at a second node (e.g., a PCF). Subscribing to the event comprises indicating one or more filters selected from the group of (i) a set of network identifiers (e.g., data network names (DNNs)) that the subscription applies to, (ii) a set of network slice identifiers (e.g., Single Network Slice Selection Assistance Information (S-NSSAIs)) that the subscription applies to, and (iii) a set of locations that the subscription applies to.

In another embodiment, the receiving unit 404 is configured to receive a notification from a second node (e.g., a PCF) that an event has occurred. The notification includes an indication of one or more of a network identifier (e.g., a DNN), a network slice identifier (e.g., a S-NSSAI), and a set of locations corresponding to the event.

Figure 4B:
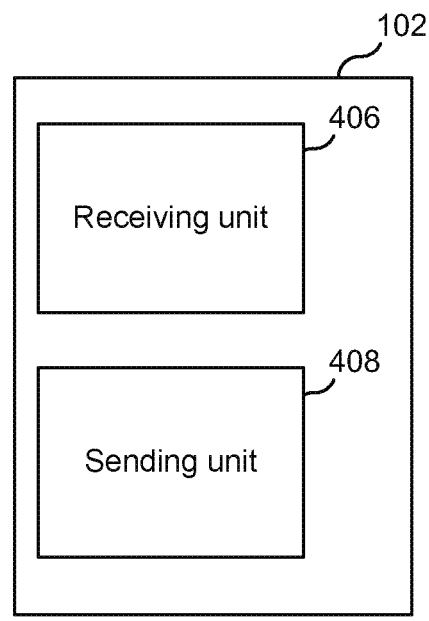
FIG. 4B is a diagram showing functional modules of a second node according to some embodiments.

FIG. 4B is a diagram showing functional modules of a second node (such as PCF 102), according to some embodiments. As shown in FIG. 4B, the second node includes one or more of a receiving unit 406 and a sending unit 408. In an embodiment, the receiving unit 406 is configured to receive a subscription from a first node (e.g., a NEF) to an event for one or more UEs. The subscription to the event comprises an indication of one or more filters selected from the group of (i) a set of network identifiers (e.g., data network names (DNNs)) that the subscription applies to, (ii) a set of network slice identifiers (e.g., Single Network Slice Selection Assistance Information (S-NSSAIs)) that the subscription applies to, and (iii) a set of locations that the subscription applies to.

In another embodiment, sending unit 408 is configured to send a notification to a first node (e.g., a NEF) that an event has occurred. The notification includes an indication of one or more of a network identifier (e.g., a DNN), a network slice identifier (e.g., a S-NSSAI), and a set of locations corresponding to the event.

Figure 5:
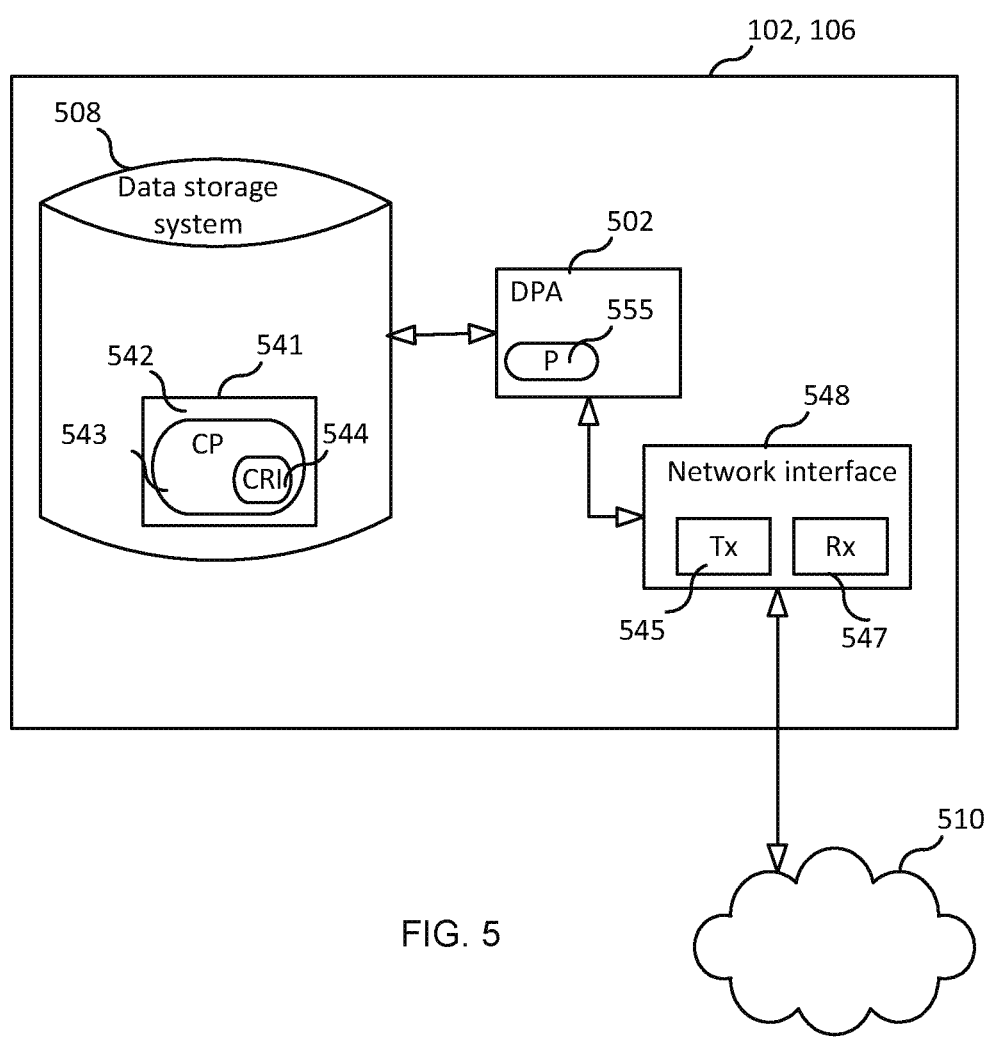
FIG. 5 is a block diagram of a node according to some embodiments.

FIG. 5 is a block diagram of a node, such as the first node (e.g. NEF 106) or second node (e.g. PCF 102), according to some embodiments. As shown in FIG. 5, the node may comprise: a data processing apparatus (DPA) 502, which may include one or more processors (P) 555 (e.g., a general purpose microprocessor and/or one or more other processors, such as an application specific integrated circuit (ASIC), field-programmable gate arrays (FPGAs), and the like); a transmitter 505 and a receiver 504 coupled to an antenna 522 for enabling the node to transmit data to and receive data from an access network (AN) node (e.g., base station); and local storage unit (a.k.a., "data storage system") 508, which may include one or more non-volatile storage devices and/or one or more volatile storage devices (e.g., random access memory (RAM)). In embodiments where the node includes a general purpose microprocessor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited, to magnetic media (e.g., a hard disk), optical media, memory devices (e.g., random access memory), and the like. In some embodiments, the CRI 544 of computer program 543 is configured such that when executed by data processing apparatus 502, the CRI causes the node to perform steps described above (e.g., steps described above with reference to the flow charts). In other embodiments, the node may be configured to perform steps described herein without the need for code. That is, for example, data processing apparatus 502 may consist merely of one or more ASICs. Hence, the features of the embodiments described herein may be implemented in hardware and/or software.

According to an example of embodiments herein disclosed, definitions of Npcf_EventExposure Service Operations and data structure related subclauses are provided. Before this disclosure, the Npcf_EventExposure subclauses describing the Service Operations and related data structures were not defined.

The following abbreviations are noted:
API Application Programming Interface
GPSI Generic Public Subscription Identifier
DNN Data Network Name
HTTP Hypertext Transfer Protocol
S-NSSAI Single Network Slice Selection Assistance Information
SUPI Subscription Permanent Identifier
Service operations defined for the Npcf_EventExposure Service are shown in table 4.2.1-1.

TABLE 4.2.1-1

Npcf_EventExposure Service Operations

| Service Operation Name | Description | Initiated by |
| --- | --- | --- |
| Notify | This service operation is used by the PCF to report UE related policy control event(s) to the NF service consumer which has subscribed to the event report service. | PCF |
| Subscribe | This service operation is used by an NF service consumer to subscribe for event notifications on a specified policy control event for one UE, a group of UE(s) or any UE, or to modify a subscription. | NF service consumer (NEF) |
| Unsubscribe | This service operation is used by an NF service consumer to unsubscribe from event notifications. | NF service consumer (NEF) |

The Npcf_EventExposure_Notify service operation enables the PCF to notify to the NF service consumers that the previously subscribed policy control event occurred.

The following procedure using the Npcf_EventExposure_Notify service operation is supported:
notification about subscribed events.

If the PCF observes policy control related event(s) for which an NF service consumer has subscribed to, the PCF shall send an HTTP POST request, with the "{notifUri}" as request URI with the value previously provided by the NF service consumer within the corresponding subscription, and the "PcEventExposureNotif" data structure.

The "PcEventExposureNotif" data structure shall include:
Notification correlation ID provided by the NF service consumer during the subscription as "notifId" attribute; and information about the observed event(s) within the "eventNotifs" attribute that shall contain for each observed event an "PcEventNotification" data structure that shall include:
1. the Policy Control event as "event" attribute;
2. for an access type change:
a) new access type as "accType" attribute; and/or
b) the new RAT type as "ratType" attribute;
3. for a PLMN change:
a) new PLMN as "plmnId" attribute;
4. the identity of the affected UE in the "supi" attribute and, if available, in the "gpsi" attribute;
5. the time at which the event was observed encoded as "timeStamp" attribute;
6. if available, information about the PDU session involved in the reported event in the "pduSessInfo" attribute, that shall include:
a) the S-NSSAI of the PDU session in the "snssai" attribute; and
b) the DNN of the PDU session in the "dnn" attribute; and
c) the IPv4 and/or IPv6 prefix in the "ueIpv4" and/or "ueIpv6" attributes; and/or
d) the Ethernet MAC address in the "ueMac" attribute; and
may include the IP domain in the "ipDomain" attribute;
7. if available, information about the services involved in the reported event in the indicated PDU session in the "repServices" attribute, which may include per identified service:
a) a list of Ethernet flows in the "ethFlowNums" attribute; or
b) a list of IP flows in the "ipFlowNums" attribute; and/or
c) an AF application identifier in the "afAppId" attribute.

If the NF service consumer cannot successfully fulfil the received HTTP POST request due to the internal error or due to the error in the HTTP POST request, the NF service consumer shall send the HTTP error response as specified in subclause 5.7.

Upon successful reception of the HTTP POST request with "{notifUri}" as request URI and a "PcEventExposureNotif" data structure as request body, the NF service consumer shall send a "204 No Content" HTTP response, for a successful processing.

Npcf_EventExposure_Subscribe service operation is used by an NF service consumer to subscribe for policy events notifications on a specified context for group of UE(s) or any UE, or to modify an existing subscription.

The following are the types of events for which a subscription can be made:
 PLMN identifier notification; and
 Change of Access Type.

The following procedures using the Nsmf_EventExposure_Subscribe service operation are supported:
 creating a new subscription;
 modifying an existing subscription.

To subscribe to event notifications, the NF service consumer shall send an HTTP POST request with: "{apiRoot}/npcf-eventexposure/v1/subscriptions/" as request URI, and the "PcEventExposureSubsc" data structure as request body.

The "PcEventExposureSubsc" data structure shall include:
 identification of the policy events to subscribe as "eventSubcs" attribute;
 indication of the UEs to which the subscription applies via:
a) identification of a group of UE(s) via a "groupId" attribute; or
b) identification of any UE by ommitting the "groupId" attribute.
 description of the event reporting information as "eventsRepInfo", which may include:
a) event notification method (periodic, one time, on event detection) as "notifMethod" attribute;
b) Maximum Number of Reports as "maxReportNbr" attribute;
c) Monitoring Duration as "monDur" attribute;
d) repetition period for periodic reporting as "repPeriod" attribute; and/or
e) immediate reporting indication as "immRep" attribute.
 an URI where to receive the requested notifications as "notifURI" attribute; and
 a Notification Correlation Identifier assigned by the NF service consumer for the requested notifications as "notifId" attribute.

The "PcEventExposureSubsc" data structure may include:
 to filter the AF sessions for which the policy event report shall occur, the identification of the services one or more AF sessions may belong to as "filterServices" attribute, which may include per service identification:
a) a list of ethernet flows in the "servEthFlows" attribute; or
b) a list of IP flows in the "servIpFlows" attribute; and/or
c) an AF application identifier in the "afAppId" attribute.
 to filter the DNNs for which the policy event report shall occur, the identification of the DNNs in the "filterDnns" attribute; and
 to filter the S-NSSAIs for which the policy event report shall occur, the identification of the S-NSSAIs in the "filterSnssais" attribute.

If the PCF cannot successfully fulfil the received HTTP POST request due to the internal PCF error or due to the error in the HTTP POST request, the PCF shall send the HTTP error response as specified in subclause 5.7.

Upon successful reception of the HTTP POST request with "{apiRoot}/npcf-eventexposure/v1/subscriptions/" as request URI and "PcEventExposure" data structure as request body, the PCF shall create a new "Individual Policy Events Subscription" resource, shall store the subscription and shall send a HTTP "201 Created" response. The PCF shall include in the "201 Created" response:
 a Location header field; and
 an "PcEventExposure" data type in the payload body.

The Location header field shall contain the URI of the created individual application session context resource i.e. "{apiRoot}/npcf-eventexposure/v1/subscriptions/{subscriptionId}".

The "PcEventExposure" data type payload body shall contain the representation of the created "Individual Policy Events Subscription".

The "PcEventExposure" data type shall include the "PcEventExposureSubc" data structure with the attributes present in the subscription, and shall include the "PcEventExposureNotif" data type when the "immRep" attribute is included in the subscription and the subscribed policy control events are available.

To modify an existing subscription to event notifications, the NF service consumer shall send an HTTP PUT request with: "{apiRoot}/npcf-eventexposure/v1/subscriptions/{subscriptionId}" as request URI, where "{subscriptionId}" is the subscription correlation ID of the existing subscription. The "PcEventExposureSubsc" data structure is included as request body as described in subclause 4.2.3.2.

NOTE 1: An alternate NF service consumer than the one that requested the generation of the subscription resource can send the PUT.

NOTE 2: The "notifURI" attribute within the PcEventExposureSubsc data structure can be modified to request that subsequent notifications are sent to a new NF service consumer.

If the PCF cannot successfully fulfil the received HTTP PUT request due to the internal PCF error or due to the error in the HTTP PUT request, the PCF shall send the HTTP error response as specified in subclause 5.7.

Upon successful reception of an HTTP PUT request with: "{apiRoot}/npcf-eventexposure/v1/subscriptions/{subscriptionId}" as request URI and PcEventExposureSubsc data structure as request body, the PCF shall store the subscription and shall send a HTTP "200 OK" response with the "PcEventExposure" data structure as response body.

The "PcEventExposure" data structure payload body shall contain the representation of the modified "Individual Policy Events Subscription".

The "PcEventExposure" data type shall include the "PcEventExposureSubc" data structure with the attributes present in the subscription, and shall include the "PcEventExposureNotif" data type when the "immRep" attribute is included in the updated subscription and the subscribed policy control events are available.

Npcf_EventExposure_Unsubscribe service operation is used by an NF service consumer to unsubscribe from event notifications.

The following procedure using the Npcf_EventExposure_UnSubscribe service operation is supported:

unsubscription from event notifications.

To unsubscribe from event notifications, the NF service consumer shall send an HTTP DELETE request with: "{apiRoot}/npcf-eventexposure/v1/subscriptions/{subscriptionId}" as request URI, where "{subscriptionId}" is the subscription correlation identifier of the existing resource subscription that is to be deleted.

If the PCF cannot successfully fulfil the received HTTP DELETE request due to the internal PCF error or due to the error in the HTTP DELETE request, the PCF shall send the HTTP error response as specified in subclause 5.7.

Upon successful reception of the HTTP DELETE request with: "{apiRoot}/npcf-eventexposure/v1/subscriptions/{subscriptionId}" as request URI, the PCF shall remove the corresponding subscription and shall send an HTTP "204 No Content" response.

Table 5.6.1-1 specifies the data types defined for the Npcf_EventExposure service based interface protocol.

TABLE 5.6.1-1

Npcf_EventExposure specific Data Types

| Data type | Section defined | Description | Applicability |
|---|---|---|---|
| EthernetFlowInfo | 5.6.2.d4 | Identification of an UL/DL ethernet flow. | |
| IpFlowInfo | 5.6.2.d5 | Identification of an UL/DL IP flow. | |
| PcEvent | 5.6.3.3 | Policy Control Events. | |
| PcEventExposure | 5.6.2.2 | Represents an Individual Policy Events Subscription resource. | |
| PcEventExposureNotif | 5.6.2.3 | Describes notifications about Policy Control events that occurred in an Individual Policy Events Subscription resource. | |
| PcEventExposureSubsc | 5.6.2.d1 | Describes the subscription with the PCF to Policy Control events represented in an Individual Policy Events Subscription resource. | |
| PcEventNotification | 5.6.2.d6 | Represents the information reported for a Policy Control event. | |
| PduSessionInformation | 5.6.2.d7 | Represents PDU session identification information. | |
| ReportingInformation | 5.6.2.d2 | Represents the type of reporting the subscription requires. | |
| ServiceIdentification | 5.6.2.d3 | Identification of the service to which the subscription applies. | |

50

Table 5.6.1-2 specifies data types re-used by the Npcf_EventExposure service based interface protocol from other specifications, including a reference to their respective specifications and when needed, a short description of their use within the Npcf_EventExposure service based interface.

TABLE 5.6.1-2

Npcf_EventExposure re-used Data Types

| Data type | Reference | Comments | Applicability |
|---|---|---|---|
| AccType | 3GPP TS 29.571 [r1] | Access Type. | |
| AfAppId | 3GPP TS 29.514 [x5] | AF application Identifier. | |
| DateTime | 3GPP TS 29.571 [r1] | Time stamp. | |
| Dnn | 3GPP TS 29.571 [r1] | Identifies a DNN. | |
| DurationSec | 3GPP TS 29.571 [r1] | Seconds of duration. | |

TABLE 5.6.1-2-continued

| Npcf_EventExposure re-used Data Types | | | |
|---|---|---|---|
| Data type | Reference | Comments | Applicability |
| EthFlowDescription | 3GPP TS 29.514 [x5] | Identifies an ethernet flow description. | |
| FlowDescription | 3GPP TS 29.514 [x5] | Identifies an IP flow description. | |
| Gpsi | GPP TS 29.514 [x5] | Generic Public Subscription Identifier. | |
| GroupId | 3GPP TS 29.571 [r1] | Identifies a group of UEs. | |
| Link | 3GPP TS 29.571 [r1] | Link. | |
| NotificationMethod | 3GPP TS 29.508 [r2] | Represents the Notification Method. | |
| PlmnId | 3GPP TS 29.571 [r1] | PLMN Identifier. | |
| RatType | 3GPP TS 29.571 [r1] | RAT Type. | |
| Snssai | 3GPP TS 29.571 [r1] | Identifies a S-NSSA.I | |
| Supi | 3GPP TS 29.571 [r1] | Identifies the SUPI of the UE. | |
| SupportedFeatures | 3GPP TS 29.571 [r1] | Used to negotiate the applicability of the optional features defined in subclause 5.8. | |
| Uinteger | 3GPP TS 29.571 [r1] | Unsigned integer. | |

The type PcEventExposure is defined in Table 5.6.2.2-1.

TABLE 5.6.2.2-1

| Definition of type PcEventExposure | | | | | |
|---|---|---|---|---|---|
| Attribute name | Data type | P | Cardinality | Description | Applicability |
| eventsSubsc | PcEventExposure-Subsc | M | 1 | Describes the subscription with the PCF to Policy Control events represented in an Individual Policy Events Subscription resource. | |
| eventNotif | PcEventExposure-Notif | C | 0 . . . 1 | Describes notifications about Policy Control events that occurred in an Individual Policy Events Subscription resource. | |

The type PcEventExposureNotif is defined in Table 5.6.2.3-1.

TABLE 5.6.2.3-1

| Definition of type PcEventExposureNotif | | | | | |
|---|---|---|---|---|---|
| Attribute name | Data type | P | Cardinality | Description | Applicability |
| notifId | string | M | 1 | Notification Correlation ID assigned by the NF service consumer. | |
| eventNotifs | map(PcEvent-Notification) | M | 1 . . . N | Represents the Policy Control Events to be reported according to the subscription corresponding to the Notification Correlation ID. | |

The type PcEventExposureSubsc is defined in Table 5.6.2.d1-1.

TABLE 5.6.2.d1-1

Definition of type PcEventExposureSubsc

| Attribute name | Data type | P | Cardinality | Description | Applicability |
|---|---|---|---|---|---|
| eventSubcs | array(PcEvent) | M | 1...N | Subscribed Policy Control events. | |
| groupId | GroupId | C | 0...1 | Represents an internal group identifier and identifies a group of UEs. It shall be present when the subscription is targeting a Group of UE(s). | |
| filterDnns | array(Dnn) | O | 1...N | Represents the DNNs for which the policy event report shall apply. If omitted it represents any DNN. | |
| filterSnssais | array(Snssai) | O | 1...N | Represents the S-NSSAIs for which the policy event report shall apply. If omitted it represents any S-NSSAI. | |
| eventsRepInfo | Reporting-information | M | 1 | Represents the reporting requirements of the subscription. | |
| notifUri | Link | M | 1 | Notification URI for Policy Control event reporting. | |
| notifId | string | M | 1 | Notification Correlation ID assigned by the NF service consumer. | |
| filterServices | array(Service-Identification) | O | 1...N | Represents the services for which the policy event report shall apply. If omitted, the policy event report shall apply for all the active services. | |
| reqSuppFeat | Supported-Features | C | 0...1 | Represents the set of NF service consumer supported features. It is sent in the HTTP POST request for the creation of the Individual Policy Events Subscription resource. | |
| suppFeat | Supported-Features | C | 0...1 | Represents the set of PCF Event Exposure agreeable supported features. It is sent in the HTTP POST response of the creation of the Individual Policy Events Subscription resource. | |

The type ReportingInformation is defined in Table 5.6.2.d2-1.

TABLE 5.6.2.d2-1

Definition of type ReportingInformation

| Attribute name | Data type | P | Cardinality | Description | Applicability |
|---|---|---|---|---|---|
| immRep | boolean | O | 0...1 | If included, when it is set to true it indicates immediate reporting of the subscribed events, if available. Otherwise, reporting will occur when the event is met. | |
| notifMethod | Notification-Method | O | 0...1 | Represents the notification method (periodic, one time, on event detection). If "notifMethod" attribute is | |

TABLE 5.6.2.d2-1-continued

| Definition of type ReportingInformation | | | | | |
|---|---|---|---|---|---|
| Attribute name | Data type | P | Cardinality | Description | Applicability |
| | | | | not supplied, the default value "ON_EVENT_DETECTION" applies. | |
| maxReportNbr | Uinteger | O | 0 . . . 1 | Represents the maximum number of reports, after which the subscription ceases to exist (i.e., the reporting ends). It may be present for the "PERIODIC" and on "ON_EVENT_DETECTION" notification methods. If omitted, there is no limit. | |
| monDur | DurationSec | O | 0 . . . 1 | Represents the monitoring duration after which the subscription ceases to exist (i.e the reporting ends). If omitted, there is no limit. | |
| repPeriod | DurationSec | C | 0 . . . 1 | Indicates the time interval between successive Policy Control event notifications. It is supplied for notification method "PERIODIC". | |

The type ServiceIdentification is defined in Table 5.6.2.d3-1.

TABLE 5.6.2.d3-1

| Definition of type ServiceIdentification | | | | | |
|---|---|---|---|---|---|
| Attribute name | Data type | P | Cardinality | Description | Applicability |
| servEthFlows | array(Ethernet-Flowinfo) | C | 1 . . . N | Ethernet flows of a service. | |
| servIpFlows | array(IpFlow-Info) | C | 1 . . . N | IP flows of a service | |
| afAppId | AfAppId | C | 0 . . . 1 | Contains an AF application identifier. | |

NOTE:
Either servEthFlows or servIpFlows and/or AfAppId attributes shall be present.

The type EthernetFlowInfo is defined in Table 5.6.2.d4-1.

TABLE 5.6.2.d4-1

| Definition of type EthernetFlowInfo | | | | | |
|---|---|---|---|---|---|
| Attribute name | Data type | P | Cardinalty | Description | Applicability |
| ethFlows | array(EthFlow-Description) | C | 1 . . . 2 | Contains the flow description for the Uplink and/or Downlink Ethernet flows. It shall be present in the subscription request. | |
| flowNumber | integer | M | 1 | Identifies the ordinal number of the Ethernet flow. | |

The type IpFlowInfo is defined in Table 5.6.2.d5-1.

TABLE 5.6.2.d5-1

Definition of type IpFlowInfo

| Attribute name | Data type | P | Cardinality | Description | Applicability |
|---|---|---|---|---|---|
| ipFlows | array(Flow-Description) | C | 1 . . . 2 | Contains the flow description for the Uplink and/or Downlink IP flows. It shall be present in the subscription request | |
| flowNumber | integer | M | 1 | Identifies the ordinal number of the IP flow. | |

The type PcEventNotification is defined in Table 5.6.2.d6-1.

TABLE 5.6.2.d6-1

Definition of type PcEventNotification

| Attribute name | Data type | P | Cardinality | Description | Applicability |
|---|---|---|---|---|---|
| event | PcEvent | M | 1 . . . N | Reported Policy Control event. | |
| accType | AccessType | C | 0 . . . 1 | Access Type. It shall be included if available when the reported PcEvent is "AC_TY_CH". | |
| ratType | RatType | C | 0 . . . 1 | RAT Type. It shall be included if available when the reported PcEvent is "AC_TY_CH". | |
| plmnId | PlmnId | C | 0 . . . 1 | PLMN Identifier. It shall be included when the reported PcEvent is "PLMN_CH". | |
| supi | Supi | C | 0 . . . 1 | SUPI of the UE. It shall be present when the subscription is targeting a group of UEs or any UE. | |
| timeStamp | DateTime | M | 1 | Time at which the event is observed. | |
| pduSessInfo | PduSession-Information | O | 0 . . . 1 | Represents PDU session information related to the observed event. | |
| repServices | Service-Identification | O | 0 . . . 1 | Represents service information related to the observed event. | |

The type PduSessionInformation is defined in Table 5.6.2.d7-1.

TABLE 5.6.2.d7-1

Definition of type PduSessionInformation

| Attribute name | Data type | P | Cardinality | Description | Applicability |
|---|---|---|---|---|---|
| snssai | Snssai | M | 1 | S-NSSAI of the PDU session. | |
| dnn | Dnn | M | 1. . .N | Dnn of the PDU session. | |
| ueIpv4 | Ipv4Addr | C | 0 . . . 1 | The IPv4 address of the served UE. | |
| ueIpv6 | Ipv6Prefix | C | 0 . . . 1 | The IPv6 prefix of the served UE. | |
| ipDomain | string | O | 0 . . . 1 | Identifies the IP domain. | |
| ueMac | MacAddr48 | C | 0 . . . 1 | UE MAC address. | |

NOTE:
Either an Ipv4Addr and/or Ipv6Prefix or UE MAC address shall be present.

The enumeration PcEvent represents the policy control events that can be subscribed. It shall comply with the provisions defined in table 5.6.3.3-1.

TABLE 5.6.3.3-1

Enumeration < EnumType1 >

| Enumeration value | Description | Applicability |
|---|---|---|
| AC_TY_CH | Access Type Change | |
| PLMN_CH | PLMN Change | |

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a first node, the method comprising:
   the first node subscribing to an event for one or more user equipments (UEs) at a Policy and Control Function (PCF), wherein subscribing to the event comprises sending to the PCF an HTTP POST request message comprising a request uniform resource identifier (URI) and a request body comprising an event exposure subscription data structure comprising: (i) an event subscription attribute identifying a policy event, (ii) a URI attribute specifying a notification URI where to receive the requested notifications, (iii) a notification identifier (ID) attribute specifying a correlation ID assigned by the first node, and (iv) at least one of a network name filter attribute comprising one or more data network names (DNNs) or a single network slice selection assistance information (S-NSSAI) attribute comprising one or more S-NSSAIs; and
   the first node receiving a notification about the event, wherein the notification was transmitted by the PCF and the notification is an HTTP POST request that comprises said notification URI and further comprises an event exposure notification data structure that comprises: (i) the correlation ID, (ii) an event notifications attribute comprising information about the event, and (iii) a PDU session attribute comprising information about a PDU session involved in the reported event and at least one of an S-NSSAI attribute identifying the S-NSSAI of the PDU session or a DNN attribute identifying the DNN of the PDU session.

2. The method of claim 1, wherein the event exposure subscription data structure comprises one or more UE identifiers.

3. The method of claim 1, wherein subscribing to the event further comprises indicating a location filter including a set of locations that the subscription applies to, wherein the set of locations that the subscription applies to includes all locations.

4. The method of claim 1, wherein the event exposure subscription data structure includes both the network name filter attribute and the S-NSSAI attribute.

5. The method of claim 1, wherein the notification notifies that an event has occurred that matches the subscribed-to event for the one or more UEs.

6. A computer program product comprising a non-transitory computer readable medium storing instructions which, when executed on at least one processor, causes the at least one processor to carry out the method of claim 1.

7. A first node, the first node comprising:
   memory;
   processing circuitry coupled to the memory, wherein the first node is configured to:
   subscribe to an event for one or more user equipments (UEs) at a Policy and Control Function (PC), wherein subscribing to the event comprises sending to the PCF an HTTP POST request message comprising a request uniform resource identifier (URI) and a request body comprising an event exposure subscription data structure comprising: (i) an event subscription attribute identifying a policy event, (ii) a URI attribute specifying a notification URI where to receive the requested notifications, (iii) a notification identifier (ID) attribute specifying a correlation ID assigned by the first node, and (iv) at least one of a network name filter attribute comprising one or more data network names (DNNs) or a single network slice selection assistance information (S-NSSAI) attribute comprising one or more S-NSSAIs; and
   a receiver for receiving a notification about the event that comprises said notification URI and further comprises an event exposure notification data structure that comprises: (i) the correlation ID, (ii) an event notifications attribute comprising information about the event, and (iii) a PDU session attribute comprising information about a PDU session involved in the reported event and at least one of an S-NSSAI attribute identifying the S-NSSAI of the PDU session or a DNN attribute identifying the DNN of the PDU session.

8. The first node of claim 7, wherein the event exposure subscription data structure comprises one or more UE identifiers.

9. The first node of claim 7, wherein subscribing to the event further comprises indicating a location filter including a set of locations that the subscription applies to, wherein the set of locations that the subscription applies to includes all locations.

10. The first node of claim 7, wherein the event exposure subscription data structure includes both the network name filter attribute and the S-NSSAI attribute.

11. The first node of claim 7, wherein the notification notifies that an event has occurred that matches the subscribed-to event for the one or more UEs.

12. A method performed by a Policy and Control Function (PCF), the method comprising:
   the PCF receiving a subscription to an event for one or more user equipments (UEs), wherein the subscription to the event was transmitted by a first node and the subscription to the event comprises an HTTP POST request message comprising a request uniform resource identifier (URI) and a request body comprising an event exposure subscription data structure comprising: (i) an event subscription attribute identifying a policy event, (ii) a URI attribute specifying a notification URI where to receive the requested notifications, (iii) a notification identifier (ID) attribute specifying a correlation ID assigned by the first node, and (iv) at least one of a network name filter attribute comprising one or more data network names (DNNs) or a single network slice selection assistance information (S-NSSAI) attribute comprising one or more S-NSSAIs; and the PCF sending toward the first node a notification about the event, wherein the notification is an HTTP POST request that comprises said notification URI and further comprises an event exposure notification data structure that comprises: (i) the correlation ID, (ii) an event notifications attribute comprising information about the event, and (iii) a PDU session attribute comprising information about a PDU session involved in the reported event and at least one of an S-NSSAI attribute identifying the S-NSSAI of the PDU session or a DNN attribute identifying the DNN of the PDU session.

13. The method of claim 12, wherein subscribing to the event further comprises indicating a location filter including a set of locations that the subscription applies to, wherein the set of locations that the subscription applies to includes all locations.

14. The method of claim 12, wherein the event exposure subscription data structure includes both the network name filter attribute and the S-NSSAI attribute.

15. The method of claim 12, wherein the notification to the first node notifies that an event has occurred that matches the subscribed-to event for the one or more UEs.

16. The method of claim 12, further comprising, prior to sending the notification to the first node that an event has occurred that matches the subscribed-to event for the one or more UEs, using the DNNs and/or the S-NSSAIs to determine that the event matches the subscribed-to event.

17. A computer program product comprising a non-transitory computer readable medium storing instructions which, when executed on at least one processor, causes the at least one processor to carry out the method of to claim 12.

18. A Policy and Control Function (PCF), the PCF comprising:
   memory;
   a transmitter;
   a receiver for receiving a subscription to an event for one or more user equipments (UEs), wherein the subscription to the event was transmitted by a first node and the subscription to the event comprises an HTTP POST request message comprising a request uniform resource identifier (URI) and a request body comprising an event exposure subscription data structure comprising: (i) an event subscription attribute identifying a policy event, (ii) a URI attribute specifying a notification URI where to receive the requested notifications, (iii) a notification identifier (ID) attribute specifying a correlation ID assigned by the first node, and (iv) at least one of a network name filter attribute comprising one or more data network names (DNNs) or a single network slice selection assistance information (S-NSSAI) attribute comprising one or more S-NSSAIs; and processing circuitry coupled to the memory, wherein the PCF is configured to:

transmit toward the first node a notification about the event, wherein the notification is an HTTP POST request that comprises said notification URI and further comprises an event exposure notification data structure that comprises: (i) the correlation ID, (ii) an event notifications attribute comprising information about the event, and (iii) a PDU session attribute comprising information about a PDU session involved in the reported event and at least one of an S-NSSAI attribute identifying the S-NSSAI of the PDU session or a DNN attribute identifying the DNN of the PDU session.

19. The PCF of claim 18, wherein subscribing to the event further comprises indicating a location filter including a set of locations that the subscription applies to, wherein the set of locations that the subscription applies to includes all locations.

20. The PCF of claim 18, wherein the event exposure subscription data structure includes both the network name filter attribute and the S-NSSAI attribute.

21. The PCF of claim 18, wherein the notification to the first node notifies that an event has occurred that matches the subscribed-to event for the one or more UEs.

22. The PCF of claim 18, wherein the PCF is further adapted to, prior to sending the notification to the first node that an event has occurred that matches the subscribed-to event for the one or more UEs, use the DNNs and/or the S-NSSAIs to determine that the event matches the subscribed-to event.

* * * * *

UNITED STATES PATENT AND TRADEMARK OFFICE
CERTIFICATE OF CORRECTION

PATENT NO. : 11,871,339 B2
APPLICATION NO. : 17/290069
DATED : January 9, 2024
INVENTOR(S) : Garcia Azorero et al.

It is certified that error appears in the above-identified patent and that said Letters Patent is hereby corrected as shown below:

In the Claims

In Column 26, Line 16, in Claim 7, delete "(PC)," and insert -- (PCF), --, therefor.

In Column 27, Line 36, in Claim 17, delete "of to" and insert -- of --, therefor.

Signed and Sealed this
Seventeenth Day of September, 2024

Katherine Kelly Vidal
*Director of the United States Patent and Trademark Office*